(12) United States Patent
Shiao

(10) Patent No.: US 7,948,230 B2
(45) Date of Patent: May 24, 2011

(54) MAGNETIC TYPE DIGITAL-ANALOGIC POSITION-SENSING DEVICE

(75) Inventor: Chih-Mao Shiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 271 days.

(21) Appl. No.: 12/329,632

(22) Filed: Dec. 7, 2008

(65) Prior Publication Data

US 2010/0141246 A1   Jun. 10, 2010

(51) Int. Cl.
*G01B 7/14* (2006.01)
*G01B 7/30* (2006.01)

(52) U.S. Cl. ............... 324/207.24; 324/207.21

(58) Field of Classification Search ............. 324/207.24, 324/207.11
See application file for complete search history.

(56) References Cited

U.S. PATENT DOCUMENTS

2009/0243598 A1* 10/2009 O'Day ............... 324/207.24
* cited by examiner

*Primary Examiner* — Reena Aurora

(57) ABSTRACT

A magnetic type digital-analogic position-sensing device utilizes plural magnetic strips and plural digital sensing readers to perform position-sensing operation. One of the magnetic strips is provided with an analogic sensing reader. After being finely divided, the signal outputted from the analogic sensing reader can cooperate with the signals outputted from the digital sensing readers to obtain the displacement of the sensor. By such arrangements, the position-sensing device can both have high environment adaptability and high resolution.

2 Claims, 6 Drawing Sheets

MAGNETIC TYPE DIGITAL-ANALOGIC POSITION-SENSING DEVICE

BACKGROUND OF THE INVENTION

1. Field of the Invention

The present invention relates to a program control system for a magnetic recording media, and more particularly to a magnetic type digital-analogic position-sensing device.

2. Description of the Prior Art

The existing sensing devices for measuring a displacement of a rotary or linear displacement device for a motor or a linear motor can be divided into two types: magnetic type and optical type. The optical type sensing devices are better than the magnetic type sensing devices in precision, so the industries which seek high precision will adopt the optical type sensing devices. A conventional optical sensing device, as shown in FIG. 1, consists of an optical scale A and a sensor B. The optical scale A includes four parallel-arranged elongated scale elements A1, A2, A3, A4, and each of the scale elements A1, A2, A3, A4 includes plural through holes A11, A21, A31, A41. The length of the through holes A11, A21, A31, A41 of the respective scale elements A1, A2, A3, A4 is the same and identical to the distance between each pair of neighboring through holes A11, A21, A31, A41 of the respective scale elements A1, A2, A3, A4. Further as shown in FIG. 2, the length of the through holes A11 of the first scale element A1 is two times as long as that of the through holes A21 of the second scale element A2, the length of the through holes A21 of the second scale element A2 is two times as long as that of the through holes A31 of the third scale element A3, and the length of the through holes A31 of the third scale element A3 is two times as long as that of the through holes A41 of the fourth scale element A4. The sensor B is provided with four digital sensing readers B1, B2, B3, B4 opposite the respective four scale elements A1, A2, A3, A4. The respective sensing readers B1, B2, B3, B4 will output a high or low signal depending on if there are the through holes of the respective scale elements A1, A2, A3, A4 or not. The signals outputted from the four sensing readers B1, B2, B3, B4 are integrated as shown in FIG. 3, so that the relative distance between the sensing device B and the optical scale A can be known from the signals of that time.

Since the length of the through holes A11, A21, A31, A41 of the respective scale elements A1, A2, A3, A4 and the distance between each pair of neighboring through holes A11, A21, A41 of the respective scale elements A1, A2, A3, A4 determine the resolution of the sensing device B (the resolution is the minimum value to measure the displacement of the sensor B). The length of through holes A11, A21, A31, A41 and the distance between each pair of neighboring through holes A11, A21, A31, A41 of the respective scale elements A1, A2, A3, A4 of the optical scale A in the optical type sensing device can be finely formed by adopting the nano technology, so that the precision is relatively high. On the contrary, the magnetic sensing device uses the magnetic scale in which N poles and S poles are alternately arranged to make the sensing reader to output a high or low signal. Since the distance between the N pole and S pole of the magnetic type sensing device cannot achieve the normal precision of the optical type sensing device, the high precision industries will select the optical type sensing devices.

However, the more precise the optical type sensing device is, the better the working environment is needed (if the working environment is not good enough, the dust or particles are likely to obstruct the through holes of the scale elements to greatly lower the precision). Since the general industries cannot provide the location with better working environment satisfying the requirements of the optical type sensing device, they can only adopt the magnetic type sensing devices which cannot be affected by the environment condition, consequently, the corresponding precision is greatly reduced.

The present invention has arisen to mitigate and/or obviate the afore-described disadvantages.

SUMMARY OF THE INVENTION

The primary objective of the present invention is to provide a magnetic type digital-analogic position-sensing device, which has both high environment adaptability and high resolution.

In order to achieve the above objective, the magnetic type position-sensing device in accordance with the present invention comprises a magnetic scale and a sensor. The magnetic scale includes plural magnetic strips, and each of the magnetic strips includes plural magnetic zones. Each of the magnetic zones equally includes an S pole and an N pole. The plural magnetic zones on the same magnetic strip have the same length, and the magnetic zones on any two of the magnetic strips have the different lengths. The sensor is located on the magnetic scale and provided with plural digital sensing readers opposite the magnetic strips of the magnetic scale. The sensor is further provided with an analogic sensing reader opposite one of the magnetic strips. The sensing readers are used to sense the magnetic polarity of the opposite magnetic strips.

When the sensor moves along the magnetic scale, the digital sensing readers will sense the magnetic polarity of the magnetic zones of the magnetic strips to output high or low signals, in addition, the analogic sensing reader will sense the magnetic polarity of the opposite magnetic strip to output a sinusoidal signal. After being finely divided, the signal outputted from the analogic sensing reader will be used to obtain the relative position of the sensor and the magnetic scale or the displacement of the sensor by integrating the signals outputted from the digital sensing readers. By such arrangements, the magnetic type position-sensing device in accordance with the present invention can have the high environment adaptability of the magnetic-type sensing device and the high resolution achieved by using the analogic sensing reader.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
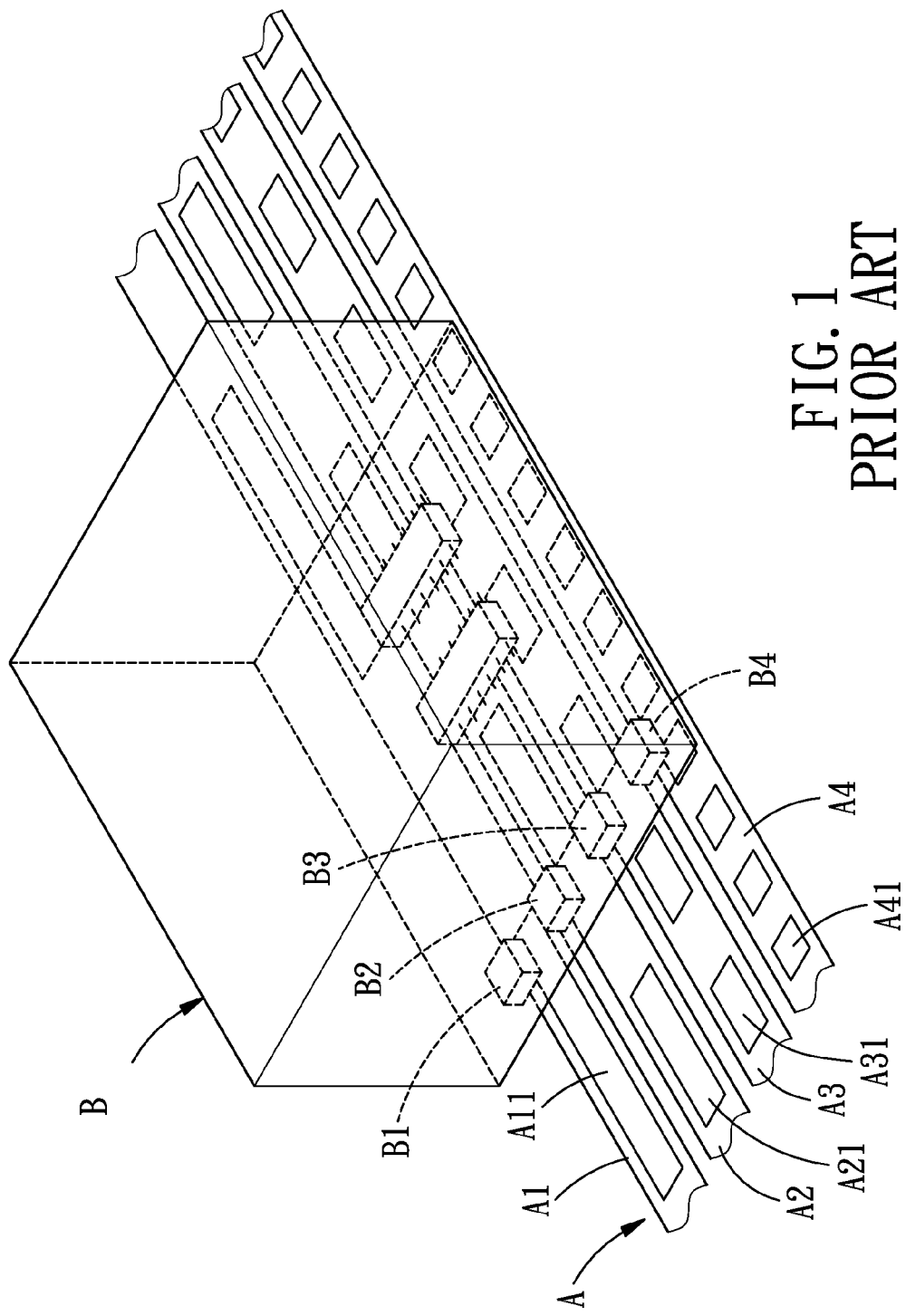
FIG. 1 is a perspective view of a conventional optical type sensing device.
Figure 2:
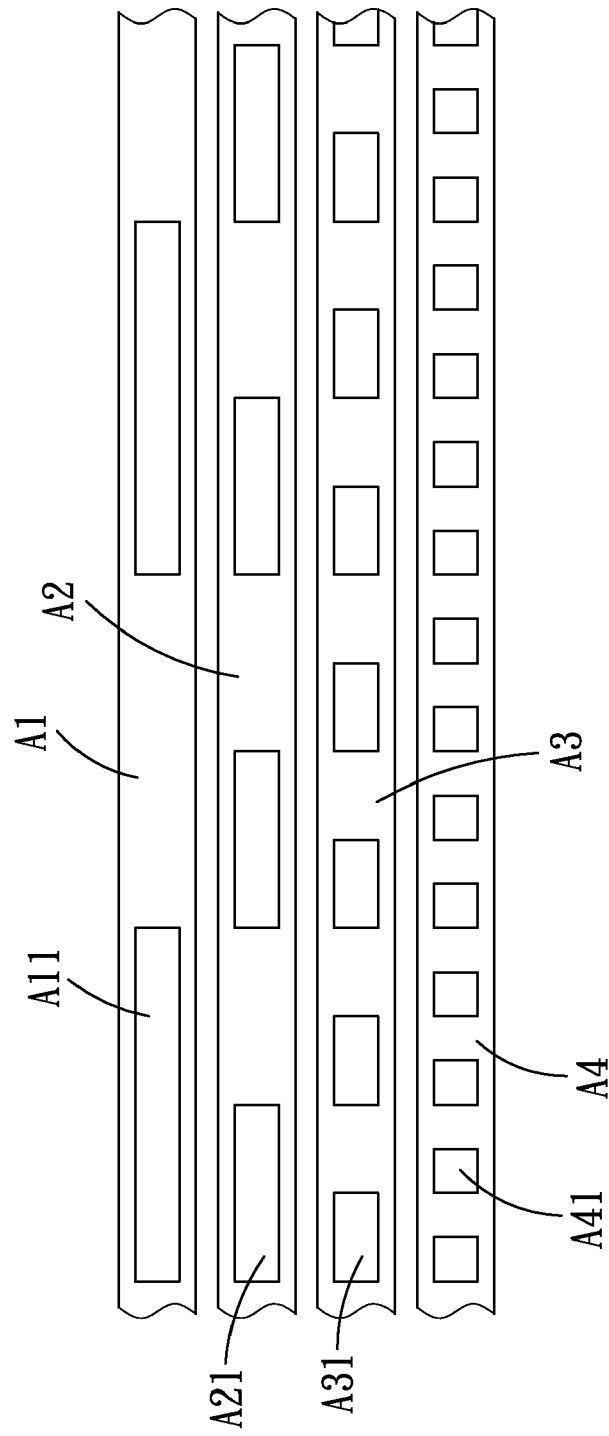
FIG. 2 is a plane view of an optical scale for the conventional optical type sensing device.
Figure 3:
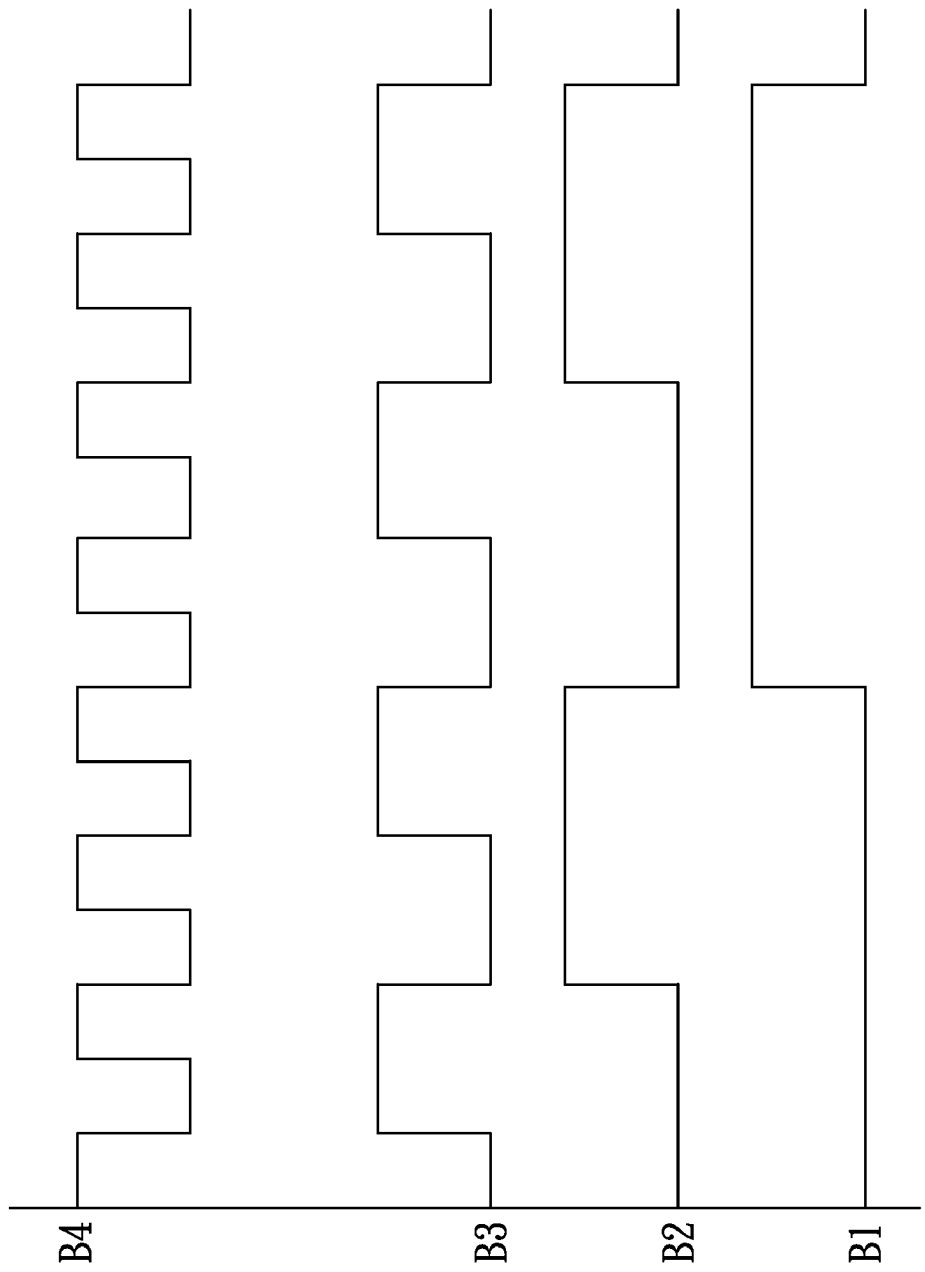
FIG. 3 is a schematic view of signals outputted from the conventional optical type sensing device.
Figure 4:
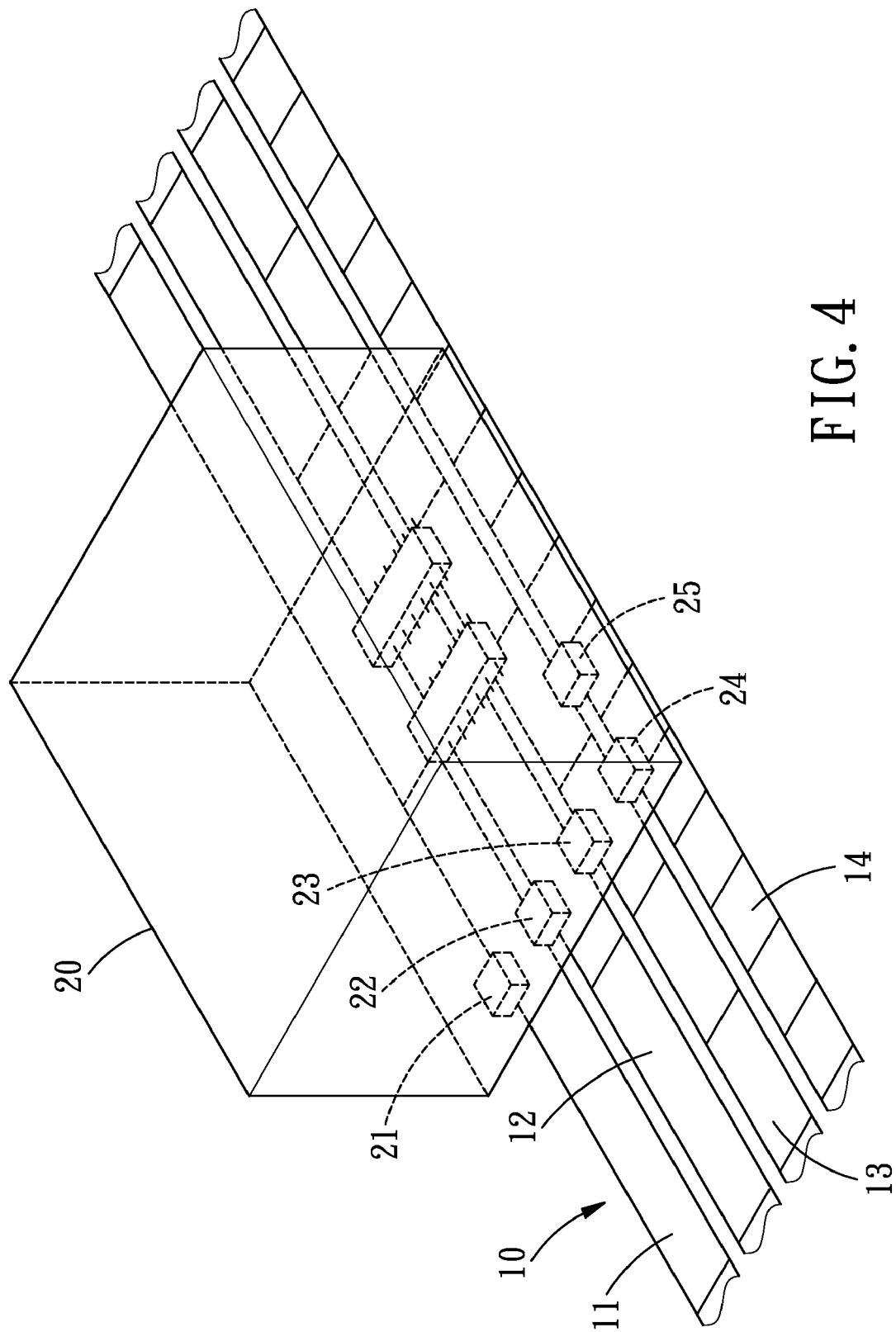
FIG. 4 is a perspective view of a magnetic type digital-analogic position-sensing device in accordance with the present invention.
Figure 5:
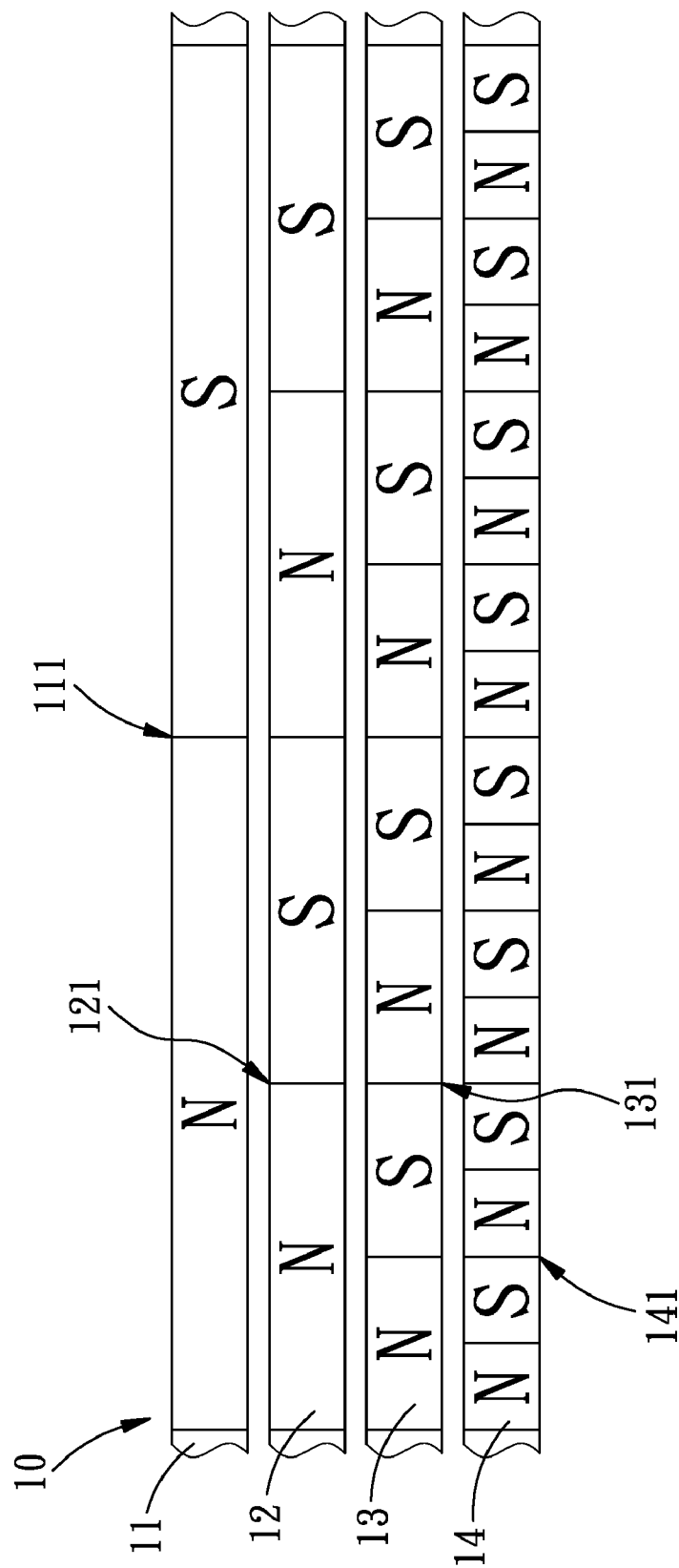
FIG. 5 is a plane view of the magnetic type digital-analogic position-sensing device in accordance with the present invention.

Referring to FIGS. 4-5, a magnetic type position-sensing device in accordance with a preferred embodiment of the present invention comprises a magnetic scale 10 and a sensor 20.

The magnetic scale 10 includes four magnetic strips 11, 12, 13, 14. The respective magnetic strips 11, 12, 13, 14 include plural magnetic zones 111, 121, 131, 141. The respective magnetic zones 111, 121, 131, 141 are equally divided into two parts that are N pole and S pole. The magnetic zones 111, 121, 131, 141 on the respective magnetic strips 11, 12, 13, 14 have the same length. The length of the magnetic zones 111 of the first magnetic strip 11 is two times as long as that of the magnetic zones 121 of the second magnetic strip 12, the length of the magnetic zones 121 of the second magnetic strip 12 is two times as long as that of the magnetic zones 131 of the third magnetic strip 13, and the length of the magnetic zones 131 of the third magnetic strip 13 is two times as long as that of the magnetic zones 141 of the fourth magnetic strip 14, in other words, the magnetic zones of any two of the magnetic strips 11, 12, 13, 14 have different lengths, and the length of the magnetic zones of one of every two neighboring magnetic strips is twice as long as that of the other one.

The sensor 20 is located on the magnetic scale 10 and includes four digital sensing readers 21, 22, 23, 24 that are located opposite the magnetic strips 11, 12, 13, 14 of the magnetic scale 10, respectively, namely the first digital sensing reader 21 is opposite the first magnetic strip 11, the second digital sensing reader 22 is opposite the second magnetic strip 12, the third sensing reader 23 is opposite the third magnetic strip 13, and the fourth sensing reader 24 is opposite the fourth magnetic strip 14. The digital sensing readers 21, 22, 23, 24 are used to sense the magnetic polarity of the respective magnetic strips 11, 12, 13, 14. The sensor 20 is further provided with an analogic sensing reader 25 opposite the fourth magnetic strip 14 to sense the magnetic polarity of the fourth magnetic strip 14. The analogic sensing reader 25 and the fourth digital sensing reader 24 are located on the same magnetic poles of the neighboring magnetic zones 141, for example, the analogic sensing reader 25 is located on an N pole of one of the magnetic zones 141 of the fourth magnetic strip 14, and the fourth digital sensing reader 24 is located on an N pole of a magnetic zone 141 neighboring the one of the magnetic zones 141 of the fourth magnetic strip 14.

Figure 6:
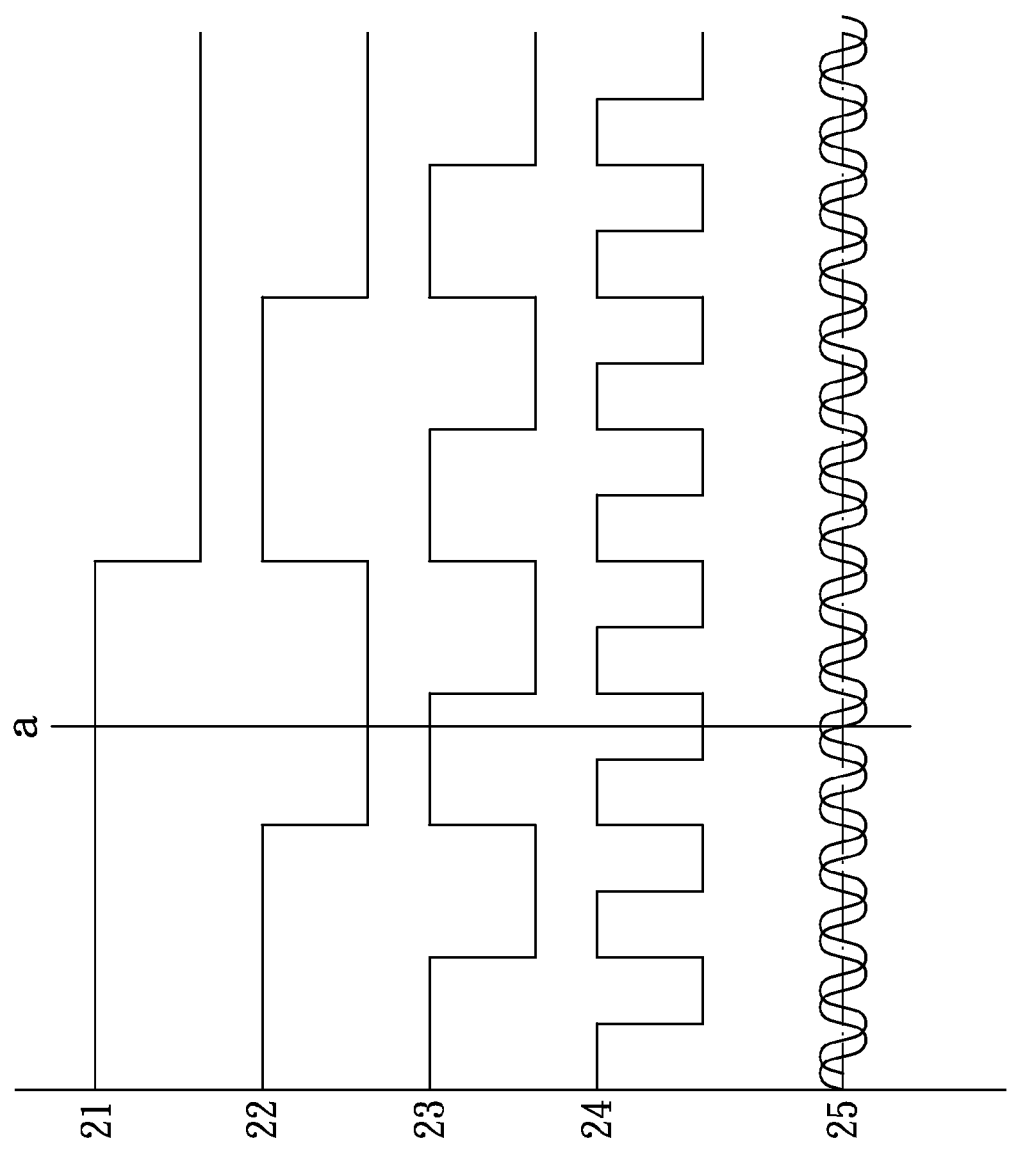
FIG. 6 is a schematic view of signals outputted from the magnetic type position-sensing device in accordance with the present invention.

When the sensor 20 moves along the magnetic scale 10, the respective digital sensing readers 21, 22, 23, 24 and analogic sensing reader 25 will move along the opposite magnetic strips 11, 12, 13, 14, and thus the digital sensing readers 21, 22, 23, 24 and analogic sensing reader 25 will sense the magnetic zones 11, 121, 131, 141 of the respective magnetic strips 11, 12, 13, 14 one by one. The magnetic polarity sensed by the respective digital sensing readers 21, 22, 23, 24 and the analogic reader 25 also changes from N pole to S pole alternately, for example, when the first sensing reader 21 moves along the first magnetic strip 11, the first sensing reader 21 faces the N pole of one of the magnetic zones 111 of the first magnetic strip 11, after a first displacement, the first sensing reader 21 will face the S pole of the one of the magnetic zones 111 of the first magnetic strip 11, after a second displacement, the first sensing reader 21 will face the N pole of another of the magnetic zones 111. As a result, it can be found that the magnetic polarity sensed by the respective sensing readers 21, 22, 23, 24 and the analogic sensing reader 25 will change from N pole to S pole alternately. The respective digital sensing readers 21, 22, 23, 24 will cooperate with the sensed N poles and S poles to output high and low signals, and the analogic sensing reader 25 will cooperate the sensed N poles or N poles to output a sinusoidal signal. The signals outputted from the respective digital sensing readers 21, 22, 23, 24 and the analogic sensing reader 25 are integrated as shown in FIG. 6.

Hence, the relative position of the sensor 10 and the magnetic scale 20 and the displacement of the sensor 10 can be roughly known from the signals outputted from the respective sensing readers 21, 22, 23, 24. The analogic sensing reader 25 outputs the sinusoidal signal, and every sinusoidal wave represents 360 degrees, so that the sinusoidal wave can be divided into many parts as desired, the minimum value of every parts can be 1 degree, 0.1 degrees or 0.01 degrees. The rough positions of the digital sensing readers 21, 22, 23, 24 cooperating with the position of the corresponding sinusoidal wave of the analogic sensing reader 25 can precisely determine the relative position of the sensor 10 and the magnetic scale 20 and the displacement of the sensor 10, for example, in the outputted signals, the signal of the first digital sensing reader 21 is high, the signal of the second digital sensing reader 22 is lower, the signal of the third digital signal 23 is low, and the signal of the fourth sensing reader 24 is low, therefore, it can be found that the position is located within the sixth pair of sinusoidal waves of the analogic sensing reader 25 (one pair of sinusoidal waves of the analogic sensing reader 25 includes two sinusoidal waves that have a 90 degree phrase angle difference therebetween). In addition to the abovementioned, as long as the degree of the signal of the analogic sensing reader 25 is known, as shown in FIG. 6, the relative position a of the sensor 10 and the magnetic scale 20 and the displacement of the sensor 10 can be precisely obtained.

Therefore, it can be found that besides high environment adaptability, the magnetic type position-sensing device also has high resolution due to the analogic sensing reader 25. The number of the magnetic strips and the number of digital sensing readers in accordance with the present invention are not limited to that described in the preferred embodiment.

While we have shown and described various embodiments in accordance with the present invention, it is clear to those skilled in the art that further embodiments may be made without departing from the scope of the present invention.

What is claimed is:

1. A magnetic type digital-analogic position-sensing device comprising: a magnetic scale including plural magnetic strips, each of the magnetic strips including plural magnetic zones, each of the magnetic zones equally includes an N pole and an S pole, the plural magnetic zones on the same magnetic strip having the same length, and the magnetic zones of any two of the magnetic strips are different in length; and a sensor being located on the magnetic scale and provided with plural digital sensing readers opposite the magnetic strips of the magnetic scale, the sensor being further provided with an analogic sensing reader opposite one of the magnetic strips, the digital sensing readers and the analogic sensing reader being all used to sense magnetic polarity of the opposite magnetic strips, when the sensor moves along the magnetic scale, the digital sensing readers will output high or low signals, and the analogic sensing reader will output a sinusoidal signal, a relative position of the sensor and the magnetic scale and a displacement of the sensor are obtained based on a comparison of all the above signals, wherein the analogic sensing reader and the digital sensing reader which is located on the same magnetic strip of the analogic sensing reader are located on the same magnetic poles of two neighboring magnetic zones.

2. A magnetic type digital-analogic position-sensing device comprising: a magnetic scale including plural magnetic strips, each of the magnetic strips including plural magnetic zones, each of the magnetic zones equally includes an N pole and an S pole, the plural magnetic zones on the same magnetic strip having the same length, and the magnetic zones of any two of the magnetic strips are different in length; and a sensor being located on the magnetic scale and provided with plural digital sensing readers opposite the magnetic strips of the magnetic scale, the sensor being further provided with an analogic sensing reader opposite one of the magnetic strips, the digital sensing readers and the analogic sensing reader being all used to sense magnetic polarity of the opposite magnetic strips, when the sensor moves along the magnetic scale, the digital sensing readers will output high or low signals, and the analogic sensing reader will output a sinusoidal signal, a relative position of the sensor and the magnetic scale and a displacement of the sensor are obtained based on a comparison of all the above signals, wherein the length of the magnetic zones of the magnetic strip where the analogic sensing reader of the sensor is located is the shortest.

* * * * *